United States Patent
Nguyen et al.

(10) Patent No.: US 6,248,161 B1
(45) Date of Patent: Jun. 19, 2001

(54) PREPARATION OF PERMANENT COLOR INKS FROM WATER-SOLUBLE COLORANTS USING SPECIFIC PHOSPHONIUM SALTS

(75) Inventors: Khe C Nguyen, Los Altos, CA (US); Raymond J Adamic, Corvallis, OR (US); Sivapackia Ganapathiappan, Mountain View, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/228,328

(22) Filed: Jan. 11, 1999

(51) Int. Cl.$^7$ .................................................. C09D 11/02
(52) U.S. Cl. .................................... 106/31.27; 106/31.47; 106/31.49; 106/31.57; 106/31.58; 106/31.59
(58) Field of Search ............................ 106/31.47, 31.49, 106/31.57, 31.58, 31.59, 31.27

(56) References Cited

U.S. PATENT DOCUMENTS

| | | | |
|---|---|---|---|
| 3,705,045 | 12/1972 | Nadolski et al. | 106/22 |
| 3,819,326 | 6/1974 | Shimauchi et al. | 8/171 |
| 4,026,713 * | 5/1977 | Sambucetti et al. | 106/31.58 |
| 4,786,288 | 11/1988 | Handa et al. | 8/495 |
| 5,108,504 | 4/1992 | Johnson et al. | 106/25 |
| 5,143,547 | 9/1992 | Kappele | 106/22 |
| 5,145,519 | 9/1992 | Kappele | 106/22 |
| 5,185,034 | 2/1993 | Webb et al. | 106/22 R |
| 5,374,302 | 12/1994 | Baurer et al. | 106/22 H |
| 5,401,303 | 3/1995 | Stoffel et al. | 106/20 R |
| 5,431,720 | 7/1995 | Nagai | 106/20 R |
| 5,462,592 | 10/1995 | Murakami et al. | 106/22 R |
| 5,534,051 | 7/1996 | Lauw | 106/22 R |
| 5,622,550 * | 4/1997 | Konishi et al. | 106/31.48 |
| 5,723,179 | 3/1998 | Wong et al. | 427/258 |
| 5,746,818 | 5/1998 | Yatake | 106/31.86 |
| 5,810,915 * | 9/1998 | Nagai et al. | 106/31.49 |
| 5,879,439 * | 3/1999 | Nagai et al. | 106/31.58 |
| 5,922,117 * | 7/1999 | Malhotra et al. | 106/31.58 |
| 5,935,309 * | 8/1999 | Moffatt et al. | 106/31.58 |
| 5,993,524 * | 11/1999 | Nagai et al. | 106/31.58 |

FOREIGN PATENT DOCUMENTS

| | | | |
|---|---|---|---|
| 0534365 | 3/1993 | (EP) | B41M/5/38 |
| 0622681 | 11/1994 | (EP) | G03F/3/10 |
| 0701902 | 3/1996 | (EP) | B41M/5/00 |
| 0779346 | 6/1997 | (EP) | C09D/11/00 |
| 0813117A1 | 12/1997 | (EP) | G03G/9/09 |
| 63-117077 | 5/1988 | (JP) | C09D/11/00 |
| 63-117078 | 5/1988 | (JP) | C09D/11/00 |
| 63-170479 | 7/1988 | (JP) | C09D/11/00 |
| 63-227676 | 9/1988 | (JP) | C09D/11/00 |
| 64-62371 | 3/1989 | (JP) | C09D/11/00 |
| 64-62372 | 3/1989 | (JP) | C09D/11/00 |
| 02016171 | 1/1990 | (JP) | C09D/11/00 |
| 6-145572 | 5/1994 | (JP) | C09D/11/00 |
| 06228474 | 8/1994 | (JP) | C09D/11/00 |
| 228474 * | 8/1994 | (JP) . | |
| 7-3196 | 1/1995 | (JP) | C09D/11/00 |

OTHER PUBLICATIONS

Derwent Abstract of JP06/145572, May 1994.*
Derwent abstract of JP07/003196, Jun. 1993.*

* cited by examiner

Primary Examiner—Helene Klemanski

(57) ABSTRACT

Water-fastness in aqueous ink-jet inks containing water-soluble dyes is achieved by using a specific ionic species having a charge opposite to that on the dye molecule. Anionic dyes typically contain sulfonate (or carboxylate) anionic groups. Using at least one specific ionic species of opposite charge, specifically, phosphonium salts, causes the colorant components to "crash" or precipitate out of the water-based ink onto the print medium due to the formation of a suitable charge complex between the ionic parts of the dye and the opposite charge of the counter-ion species. Other positively charged salts, such as quaternary ammonium salts, carbonium salts, iodonium salts, sulfonium salts, and pyrillium salts may be used to improve aqueous dispersion stability and thus printability. Such additional cationic salt partially replaces the phosphonium salt(s). Alternatively, certain surfactants, such as aromatic ethoxylates, polyethylene oxide ethers, or polypropylene oxide ethers may be used to improve print quality.

10 Claims, No Drawings ained color gamut. Examples of patents that are directed to
PREPARATION OF PERMANENT COLOR INKS FROM WATER-SOLUBLE COLORANTS USING SPECIFIC PHOSPHONIUM SALTS

TECHNICAL FIELD

The present invention is directed to ink-jet ink printing, and, more particularly, to providing ink compositions containing water-soluble dyes that are color-permanent, particularly, water-fast.

BACKGROUND ART

A number of ink-jet ink sets utilize water-soluble dyes, which are highly soluble in water, in order to achieve the right color gamut. Examples of patents that are directed to ink-jet ink sets for achieving the desired color gamut include U.S. Pat. No. 5,108,504, issued Apr. 28, 1992, to Loren E. Johnson et al and entitled "High Chroma Color Dye-Set for Use in Ink-Jet Inks Employing Polysaccharide-Containing Vehicles"; U.S. Pat. No. 5,143,547, issued Sep. 1, 1992, to William D. Kappele and entitled "Specific Dye Set for Thermal Ink-Jet Printing on Plain and Coated Papers"; U.S. Pat. No. 5,145,519, issued Sep. 8, 1992, to William D. Kappele and entitled "Specific Dye Set for Thermal Ink-Jet Printing"; U.S. Pat. No. 5,185,034, issued Feb. 9, 1993 and entitled "Ink-Jet Inks with Improved Colors and Plain Paper Capacity"; and U.S. Pat. No. 5,534,051, issued Jul. 9, 1996, to Hiang P. Lauw and entitled "Specific Dye Set for Thermal Ink-Jet Printing"; all of the foregoing cited patents are assigned to the same assignee as the present application.

However, many dye-based inks, after being printed, exhibit poor water-fastness. There is an increased demand by consumers on the permanence or durability of ink-jet print, including water-fastness, light-fastness, smear-fastness, smudge-fastness, etc. The purpose of the present invention is to improve the durability of water-soluble dye-based inks, especially the water-fastness, smear-fastness, smudge-fastness, and light-fastness, lumped together under the term "color permanence", of such inks.

DISCLOSURE OF INVENTION

In accordance with the present invention, color permanence in ink-jet inks containing water-soluble dyes is achieved by using a specific ionic species having a charge opposite to that on the dye molecule. In most ink-jet inks, the dyes employed are anionic dyes. Such anionic dyes typically contain one or more sulfonate or carboxylate anionic groups. Using a specific ionic species of opposite charge, namely, phosphonium salts, causes the colorant components to "crash" or precipitate out of the water-based ink onto the print medium due to the formation of a suitable charge complex between the ionic parts of the dye and the opposite charge of the counter-ion species.

The phosphonium salt may be used alone to achieve improved color permanence. Alternatively, the phosphonium salt may be combined with other phosphonium salts or other cationic salts, such as quaternary ammonium salts, carbonium salts, iodonium salts, sulfonium salts, and pyrillium salts to improve aqueous dispersion stability and thus printability. Further, other cationic species, such as cationic polymers and polyfunctional cationic salts may be so combined with the phosphonium salt(s). Such additional cationic species partially replace the phosphonium salt(s). Alternatively, certain surfactants, such as aromatic ethoxylates, polyethylene oxide ethers, or polypropylene oxide ethers may be used to improve print quality.

BEST MODES FOR CARRYING OUT THE INVENTION (A) Water-fast Phosphonium Salt Additives The present invention discloses a novel method of achieving color permanence, and, more particularly, water-fastness ink components from water-soluble dyes. In this invention, the water solubility of the dye molecules is particularly enhanced by anionic groups such as sulfonates or carboxylates attached to the dye molecule.

In accordance with the present invention, a specific phosphonium salt can form a complex with anionic dye (water soluble) due to the charge exchange between anionic dye and cationic phosphonium ion. The so-called dye-complex becomes essentially hydrophobic and render a permanent print which can resist against water (water-fastness), solvent (smear-fastness), mechanical rubbing with liquid (smudge-fastness) and, in some case, against the lighting condition where the print is exposed (light-fastness).

On the other hand, due to the increased hydrophobicity, the dye-complex is occasionally susceptible to precipitation, even in the ink, and causes a problem for printability. The present invention also provides a solution for good printability with such kind of dye-complex by a suitable selection and design of chemistry, concentration of phosphonium salt molecule so that minimized intermolecular collision in the ink and maximized intermolecular collision in the print can be achieved. The minimized collision between the cationic salt and anionic dyes is found effective to maximize the pen performance including stable jettability (no decap, no kogation). In some cases, the addition of a third component such as surfactants or other cationic salts, including a second phosphonium and/or non-phosphonium salt, is required to gain this kind of minimal interaction and stable printability. The maximized collision between phosphonium salt and anionic dye in the print is achieved when the ink vehicle (water, solvents, etc.) disappears, such as by penetration into the print media or by evaporation, and it does provide the highest yield of dye-complex formation, required for the print permanence, including primarily water-fastness and secondarily other physical properties such as smear-fastness, smudge-fastness, and light-fastness.

The following mechanism likely occurs in the present invention associated with phosphonium salt and anionic dyes:

(a) Step 1: Aqueous Dispersion

Dispersion of the dye molecule in water occurs due to its hydrophilicity associated with anionic functional groups. Dispersion of the phosphonium salt in water occurs due to its hydrophilicity associated with cationic salt part. However, the hydrophobic part of the phosphonium salt molecule tends to cause the reduction of this dispersion. So, water-miscible co-solvents are helpful to gain back the aqueous dispersion. The collision between aqueous active dye and salt molecule is essentially prohibited with the practical concentration of dye and salt in the printable ink.

(b) Step 2: Molecular Collision

Collision between the anionic dye and the cationic phosphonium salt must occur due to a shortened collision distance when the water/co-solvent concentration in the print is reduced, as by penetration into the print media or by evaporation.

(c) Step 3: Charge Exchange

Complex formation between the anionic dye and the cationic phosphonium salt must occur in order to gain hydrophobicity. This process must be irreversible to insure the water-fastness of a dried print. In order to form the dye-salt complex, there must be a right oxidation potential and reduction potential between two molecules because one will act as electron donor and the other will act as electron acceptor. The hydrophobic interaction will lock the complex and prohibit the molecules from going back to the free form. If the redox potential is not right, the collision will not end up with a charge exchange and then the complex will not be strongly formed. The complex force will be destroyed again in a dried print and the water-fastness of the print will be poor.

(d) Step 4: Complex Stabilization

The stability or stabilization process occurs by hydrophobic interaction and charge stabilization, as mentioned above.

Here, it is necessary to clarify the electrochemical stability of the complex, required for permanent print and the stability of the water dispersion of the complex, and required for good printability. The term "stable complex" described in Step 4 means "electrochemically stable complex", which is formed when the cationic species is ready to gain back its electron from the anionic species and when the anionic species is ready to give away its electron to the cationic species in order to form a neutral species. Such a stable complex is not easily re-ionized by water in the solid state. Another contributing factor to the stable complex is the strong hydrophobic interaction between bulky cationic species and bulky anionic species. Charge exchange may occur between small molecular weight salts such as $NaCl$, $K_2SO_4$, etc. However, the formed new salt $KCl$, $Na_2SO_4$, etc. is not the stable complex because $K^+$, $Na^+$, $Cl^-$, $SO_4^=$, etc. are associated in the aqueous environment only.

In the present invention, in many cases, the bulky cations are desired, and the bulky anions just associate in the ink and the bulky chemistry forms an irreversible complex when dehydrated. Even though it is believed that the ionic dyes can form a complex with any opposite charge ionic species, it is rarely to find the dye-complex exhibiting superior water-fastness in the solid state. For example, the conventional/monofunctional cationic salts such as ammonium salts, including quaternary ammonium salts, pyridium salts, piperidinium salts, and the like, do not show any improvement of water-fastness when added into water soluble anionic dyes. Similarly, other conventional cationic species including carbonium salts, iodonium salts, sulfonium salts, pyrrilium salts, etc. also do not show any improvement of water-fastness of water-soluble anionic dyes. Also again, among the class of phosphonium salts, it has been discovered that not every phosphonium salt renders good improvement of water-fastness to the water-soluble anionic dye, but only certain phosphonium salts with specific chemistry do so. These phosphonium salts are called water-fast phosphonium salts additives. The phosphonium salts which do not render the water-soluble dyes into water-fast ink are called non-water-fast phosphonium salt additives.

The water-fast phosphonium salts additives of the present invention must have one of the following formulae:

$$(Ar)_3\text{—}P^+\text{—}R1\ldots X^- \quad (1)$$

$$X^-\ldots (Ar)_3\text{—}P^+\text{—}[R2]_n\text{—}(Ar)_3\text{—}P^+\ldots X^- \quad (2)$$

$$(R3)_3\text{—}P^+\text{—}R1\ldots X^- \quad (3)$$

$$X^-\ldots (R3)_3\text{—}P^+\text{—}[R2]_n\text{—}(R3)_3\text{—}P^+\ldots X^- \quad (4)$$

where

Ar=aryl or substituted aryl, including phenyl, naphthyl, anthracenyl, with or without heteroatoms, including pyridinyl, piperidinyl, pyrrolidino, triazinyl, benzotriazolyl, or thiobenzo.

$R_1$=alkyl, alkenyl, aryl with or without substituents such as —OH, —$NH_2$, —$NR_2$—CO, —CHO, —COOH, —COO, —SH, —$NO_2$. $R_1$ may also contain conjugated double bonds. The number of carbon atoms must be equal to or greater than 5.

$R_2$, $R_3$=alkyl, alkenyl, aryl with or without substituents such as —OH, —$NH_2$, —$NR_2$—CO, —CHO, —COOH, —COO, —SH, —$NO_2$. $R_2$ and $R_3$ may also contain conjugated double bonds. The number of carbon atoms must be equal to or greater than 0.

X=halogen atom such as $Cl^-$, $Br^-$, $I^-$, $F^-$, or other anionic counter ion, such as $PF_6^-$, $BF_4^-$, $HSO_3^-$, $NH_4SO_3^-0$ or the like.

n=an integer in the range of 0 to 9.

In the Formulae (1) to (4), the ellipses denote ionic association between the cation and the anion.

Tables I, II, III, and IV below list several examples of water-fast phosphonium salt additives useful in the practice of the invention. The water-fast phosphonium salts of this invention have at least 5 carbon atoms and are present in an amount ranging from about 0.01 to 5 wt % of said ink, preferably the water-fast phosphonium salt is present in an amount ranging from about 0.1 to 25 wt % of said ink, still more preferably from about 1 to 15 wt % of said ink.

TABLE I

List of Water-fast Phosphonium Salt Additives Useful in the Practice of the Present Invention, Formula (1).

| No. | $R_1$ | Name |
|---|---|---|
| 1-1 | —$(CH_2)_5CH_3$ | n-hexyl triphenyl phosphonium bromide |
| 1-2 | —$(CH_2)_6CH_3$ | n-heptyl triphenyl phosphonium bromide |
| 1-3 | —$CH_2Ph$ | benzyl triphenyl phosphonium bromide |
| 1-4 | —$CH_2Ph$ | benzyl triphenyl phosphonium chloride |
| 1-5 | —$(CH_2)_{11}CH_3$ | dodecyl triphenyl phosphonium bromide |
| 1-6 | —$CH_2PhOCH_2CH_3$ | (4-ethoxybenzyl) triphenyl phosphonium bromide |
| 1-7 | —$(CH_2)_3OCH_2Ph$ | (3-benzyloxypropyl) triphenyl phosphonium bromide |
| 1-8 | —$CH_2COPh$ | phenacyl triphenyl phosphonium bromide |
| 1-9 | —$CH_2COCH_2$-$COOC_2H_5$ | [3-(ethoxycarbonyl)-2-oxypropyl] triphenyl phosphonium chloride |
| 1-10 | —$CH_2PhOH$ | (2-hydroxybenzyl) triphenyl phosphonium bromide |
| 1-11 |  | benzotriazol-1-yloxytripyrrolidinophosphonium hexafluorophosphate |
| 1-12 | | triphenyl(2-pyridylmethyl) phosphonium chloride hydrochloride |
| 1-13 | | triphenylphosphonium cyclopentadienide |
| 1-14 | | N-(4-butyl) phthalimido triphenyl phosphonium bromide |
| 1-15 | | 3-bromobenzyl triphenyl phosphonium chloride |
| 1-16 | | 2-acetonapthonyl triphenyl phosphonium bromide |
| 1-17 | | 2',5'-dimethoxyphenacyltriphenyl phosphonium bromide |
| 1-18 | | 1-hydroxydodecyl triphenyl phosphonium bromide |
| 1-19 | | 2-ethylindolinyl triphenyl phosphonium bromide |
| 1-20 | | 3'-methoxyphenacyl triphenyl phosphonium bromide |
| 1-21 | | 3-methylpyrridinyl triphenyl phosphonium bromide |
| 1-22 | 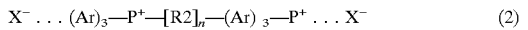 | phenacyl dimethylaminophenyl diphenyl phosphonium chloride |
| 1-23 |  | methyl (dimethylaminophenyl diphenyl) phosphonium bromide |
| 1-24 | 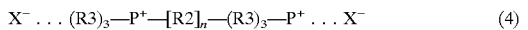 | n-hexyl diphenyl(p-tolyl)-phosphonium bromide |

TABLE I-continued

List of Water-fast Phosphonium Salt Additives
Useful in the Practice of the Present Invention,
Formula (1).

| No. | $R_1$ | Name |
| --- | --- | --- |
| 1-25 | | [2-(1,3-dioxan-2-yl)ethyl]-triphenylphosphonium bromide |
| 1-26 | | (1,3-dioxolan-2-ylmethyl)-triphenylphosphonium bromide |
| 1-27 | | phenacyl triphenyl phosphonium chloride* |

Notes: (1) The source of all chemicals was Aldrich, unless denoted *, in which case the source was in-house, Hewlett-Packard.
(2) Ph = phenyl (-$C_6H_5$).

TABLE II

List of Water-fast Phosphonium Salt Additives Useful in the Practice of the Present Invention, Formula (2).

| No. | Name |
| --- | --- |
| 2-1 | p-xylylene bis(triphenyl phosphonium bromide) |
| 2-2 | p-xylylene bis(triphenyl phosphonium chloride) |
| 2-3 | o-xylylene bis(triphenyl phosphonium bromide) |

Note: The source of all chemicals was Aldrich.

TABLE III

List of Water-fast Phosphonium Salt Additives Useful in the Practice of the Present Invention, Formula (3).

| No. | Name |
| --- | --- |
| 3-1 | benzotriazol-1-yloxytris(dimethylamino)-phosphonium hexafluorophosphate |
| 3-2 | stearyl tributyl phosphonium bromide |
| 3-3 | diallylphenylphosphonium bromide |
| 3-4 | tetrakis(hydroxymethyl)phosphonium chloride |
| 3-5 | hexyltributyl phosphonium bromide |
| 3-6 | hexyl diphenylvinyl phosphonium chloride* |

Note: The source of all chemicals was Aldrich, unless denoted *, in which case the source was in-house, Hewlett-Packard.

TABLE IV

List of Water-fast Phosphonium Salt Additives Useful in the Practice of the Present Invention, Formula (4).

| No | Name |
| --- | --- |
| 4-1 | 1,1,1,3,3,3-hexakis(dimethylamino)-diphosphazenium tetrafluoroborate |

Note: The source of all chemicals was Aldrich.

(B) Improved Printability (B-1) Non-Ionic Surfactant

Due to the fact that the increased hydrophobicity is the key contribution of the water-fastness, the dye-complex is occasionally susceptible to precipitation, even in the pen, and causes a problem for printability. Thus, the dye-complex need to be well-dispersed in the aqueous-based vehicle to assure the good and stable jettability. Another purpose of the present invention is to provide a solution for stable jetting properties by suppressing the precipitation of the dye-complex in the pen and/or in the aqueous solution. In the present invention, the inventors discovered suitable surfactants which can stabilize the complex dispersion and render good printability even with small drop volume ink jet pens. Generally speaking, the volume of the ink drop determines the jettability. A smaller drop volume is more difficult to jet. So, if the dye-complex forms a large particle size, for example, greater than sub-micron, it would not be jetted out, even from a large drop volume pen of 40 pl. In accordance with the present invention, one or more surfactants can finely divide the dye-complex down to the single dye-complex molecule and significantly improves the jettability, even with a very small drop volume pen, for example, below 15 pl.

Specific surfactants that are useful in improving such jettability include the non-ionic types that can minimize the precipitation and agglomeration and thus render significant improvement of printability. Examples of these surfactants include SOLSPERSE 27,000, BRIJ78, BRIJ92, TERGITOL 15-S-5, TERGITOL 15-S-7, TERGITOL 15-S-9, TERGITOL 15-S-12, TERGITOL 15-S-22, TERGITOL 15-S-30, TERGITOL 15-S-40. SOLSPERSE surfactants are aromatic ethoxylates, available from Zeneca. BRIJ surfactants are polyethylene oxide ethers, available from ICI Surfactants. TERGITOL surfactants are polyethylene or polypropylene oxide ethers.

If employed, the surfactant concentration in the ink ranges from about 0.001 to 50 wt %, preferably from about 0.01 to 10 wt %, and most preferably from about 0.1 to 5 wt %.

Usually, each anionic group of the dye molecule contributes to the water solubility of the dye. There is a need to cap each anionic group by one phosphonium salt molecule if it is monofunctional. For example, if the dye carries two anionic groups, then it is necessary to use a molar ratio of dye/monofunctional phosphonium salt=1/2. If the dye has 3 anionic groups, then the molar ratio of dye to monofunctional phosphonium salt is 1/3. The concentration of surfactant is dependent on the concentration and the chemistry of the water-fast phosphonium salts utilized in the formulation. The phosphonium salt having a higher number of carbon atoms will need more surfactant to be well-dispersed in water. So, it is not a linear relationship between surfactant concentration and phosphonium salt concentration. That is why there is a wide range in the concentration of surfactant relative to the phosphonium salt. Also, it should be noted that an excess amount of the surfactant in the ink may cause the adverse effect on water-fastness. Simple experimentation will determine the maximum concentration of the surfactant for a given phosphonium salt and its concentration. In general, a longer alkyl chain substituted in the salt requires a higher concentration of surfactant in order for the dye-salt complex to be well-dispersed.

(B-2) Non-Water-Fast Phosphonium Salt Additives

Besides the suitable surfactants as mentioned above, the inventors also discovered suitable phosphonium salts which can stabilize the aqueous dispersion of the complex.

Different from the water-fast phosphonium salt additives listed in Tables I, II, III, and IV, these non-water-fast phosphonium salts are not necessary for improving the water-fastness of the dye-complex. However, they can act as a surfactant and increase the aqueous dispersion stability of the water-fast dye-complex and thus improve the printability of the water-fast dye-complex. Table V below lists examples of such non-water-fast phosphonium salts.

TABLE V

List of Phosphonium Salts Which Can Improve the
Aqueous Dispersion Stability of the Water-fast Dye-complex.

| No. | Name |
|---|---|
| V-1 | allyl triphenyl phosphonium bromide |
| V-2 | allyl triphenyl phosphonium chloride |
| V-3 | vinyl triphenyl phosphonium bromide |
| V-4 | (3-bromobutyl)triphenyl phosphonium bromide |
| V-5 | (4-bromobutyl)triphenyl phosphonium bromide |
| V-6 | (bromodifluoromethyl)triphenylphosphonium bromide |
| V-7 | chloroethylene triphenyl phosphonium bromide |
| V-8 | 1,1,1-trifluoroacetonyl triphenyl phosphonium bromide |
| V-9 | methyl triphenyl phosphonium bromide |
| V-10 | ethyl triphenyl phosphonium bromide |
| V-11 | propyl triphenyl phosphonium bromide |
| V-12 | n-butyl triphenyl phosphonium bromide |
| V-13 | iso-propyl triphenyl phosphonium bromide |
| V-14 | n-pentyl triphenyl phosphonium bromide |
| V-15 | acetonyl triphenyl phosphonium bromide |
| V-16 | 4-carboxybutyl triphenyl phosphonium bromide |
| V-17 | (ethoxycarbonylmethyl) triphenyl phosphonium bromide |
| V-18 | (methoxymethyl) triphenyl phosphonium bromide |
| V-19 | triphenyl phosphonium hydrobromide |
| V-20 | (2-hydroxyethyl) triphenyl phosphonium chloride |
| V-21 | (2-hydroxyethyl) triphenyl phosphonium bromide |
| V-22 | [3-hydroxy-2-methylpropyl]triphenyl phosphonium bromide |
| V-23 | [2-(trimethylsilyl)ethoxymethyl]triphenyl phosphonium chloride |
| V-24 | methyltriphenoxy phosphonium iodide |
| V-25 | [3-(dimethylamino)propyl]triphenyl phosphonium bromide |
| V-26 | dimethylaminoethyl triphenyl phosphonium bromide |

Note: The source of all chemicals was Aldrich.

(B-3) Combination with Other Cationic Salts

Besides suitable surfactants and aqueous dispersion-stabilizing phosphonium salts as mentioned above, the inventors discovered suitable cationic salts which can also stabilize the aqueous dispersion of the complex and thus, improve the printability of the water-fast dye-complex. These cationic salts are not phosphonium salts, such as listed in Table V, but they can work similarly in stabilizing the aqueous dispersion of the water-fast dye-complex. If these cationic salts are used alone, they may not render good enough (practical level) water-fastness to the dye-complex product. However, the combination of these specific cationic salts and specific phosphonium salts evidence an improvement in both water-fastness and printability.

These cationic salts that are suitably employed in the practice of the present invention have a general formulae (5) and (6):

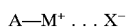  (5)

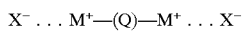  (6)

where

A=alkyl, aryl, heterocycle with or without substituent groups.

M=(1) N-salts, including quaternary ammonium salts, pyridinium salts, piperazinium salts, uronium salts, pyrrolizinium salts, imidazolium salts, thiazolium salts, oxazolium salts, selenazolium salts, morpholinium salts, tetrazolium salts; (2) O- and S-salts including pyrrylium salts, sulfonium salts, thiophenium salts; (3) C-salts, including carbonium salts, ylium salts; (4) halogen salts, including iodonium salts; (5) ruthenium salts; (6) ferrocenium salts; (7) tropylium salts.

Q=alkyl, alkoxy, aryl, alkene, heterocycyle, with or without substituents.

X=halogen (Cl, Br, I, F), hexafluoro phosphate, tetrafluoro borate, sulfonate, sulfate including small anions.

The cationic salts that can be used to improve the aqueous dispersion ability of water-fast dye-phosphonium salt complexes are listed in Table VI below.

TABLE VI

List of Other Cationic Salts That Can Be Used to Improve
the Aqueous Dispersion Stability of Water-fast
Dye-Phosphonium Salt Complexes.

| No. | Type of salt | Name |
|---|---|---|
| VI-1 | Quaternary ammonium salt | 4-(dimethylamino)pyridinium tribromide |
| VI-2 | -do- | dodecylethyldimethylammonium bromide |
| VI-3 | -do- | 1-dodecylpyridinium chloride hydrate |
| VI-4 | -do- | dodecyltrimethylammonium bromide |
| VI-5 | -do- | 1-ethyl-3-methyl-1H-imidazolium chloride |
| VI-6 | -do- | 1-ethyl-4-(methoxycarbonyl)pyridinium iodide |
| VI-7 | -do- | 6-hydroxy-2,4,5-triaminopyrimidine sulfate |
| VI-8 | -do- | 2-hydroxy-4-methylpyrimidine hydrochloride |
| VI-9 | -do- | stearyl trimethylammonium chloride |
| VI-10 | Thiapyrrilium salt | p-xylylenebis(tetrahydrothiophenium chloride) |
| VI-11 | Sulfonium salt | trimethyl sulfonium iodide |
| VI-12 | Iodonium salt | diphenyl iodonium chloride |
| VI-13 | Carbonium salt | No example provided |
| VI-14 | Ferrocenium salt | ferrocenium hexafluorophosphate |
| VI-15 | Inner salt | dodecyldimethyl(3-sulfopropyl)ammonium hydroxide |
| VI-16 | -do- | 1-(N,N-dimethylcarbamoyl)-4(2-sulfoethyl)pyridinium hydroxide |
| VI-17 | -do- | 2-ethyl-5-phenylisoxazolium-3'-sulfonate |
| VI-18 | Poly cations salts | hexadimethrine bromide |
| VI-19 | -do- | p-xylylenebis(tetrahydrothiophenium chloride) |
| VI-20 | -do- | 1,1'-trimethylenebis[4-(hydroxyiminomethyl)pyridinium bromide] |
| VI-21 | -do- | 1,1'-diheptyl-4,4'-bipyridinium dibromide |
| VI-22 | -do- | 1,1'-dioctadecyl-4,4'-bipyridinium diperchlorate |
| VI-23 | -do- | ethyl viologen dibromide |
| VI-25 | -do- | 1,1'-dioctadecyl-4,4'-bipyridinium bromide |
| VI-26 | Ferrocene | ferrocenium hexafluorophosphate |

Note: The source of all chemicals was Aldrich.

(B-4) Combination with Cationic Polymer

The water-fast phosphonium salt additives can also be used together with one or more cationic polymers for further enhancement of printability and water-fastness.

TABLE VII

List of Useful Cationic Polymers.

| No. | Name |
| --- | --- |
| VII-1 | poly(vinylbenzyl trimethylammonium chloride) |
| VII-2 | poly(4-vinylpyridine hydrochloride) |
| VII-3 | polyethyleneimine, 80% ethoxylated |
| VII-4 | polyaniline, sulfonated |
| VII-5 | poly(diallyldimethylammonium chloride) |

Note: The source of all chemicals was Aldrich.

(C) Improved Light-fastness

The inks of the presence invention may evidence poor light-fastness due to certain photochemical process associated with certain dye-complexes. This problem is overcome by adding additives to prevent photooxidation, photoreduction, and photo-catalysis caused by the interaction between dye molecules and the partner phosphonium salt. These additives can be specific phosphonium salts which do not cause the reduction of light-fastness properties of the dye colorant, as listed in Table VIII below. These additives can also be non-phosphonium compounds such as triazine, benzotriazol, and UV-absorbing agents including polymers as listed in Table IX below. Depending on solubility, the maximum concentration of the light-fastness is about 10 wt %, although typically the concentration is about 3 to 5 wt %.

TABLE VIII

Light-fast Phosphonium Salts.

| No. | Name |
| --- | --- |
| VIII-1 | (ethoxycarbonylmethyl) triphenyl phosphonium bromide |
| VIII-2 | (ethoxycarbonylmethyl) triphenyl phosphonium chloride |
| VIII-3 | (methoxymethyl) triphenyl phosphonium bromide |
| VIII-4 | triphenyl phosphonium hydrobromide |
| VIII-5 | (2-hydroxyethyl) triphenyl phosphonium chloride |
| VIII-6 | (2-hydroxyethyl) triphenyl phosphonium bromide |
| VIII-7 | [3-hydroxy-2-methylpropyl] triphenyl phosphonium bromide |
| VIII-8 | [2-(trimethylsilyl)ethoxymethyl] triphenyl phosphonium chloride |
| VIII-9 | methyltriphenoxy phosphonium iodide |
| VIII-10 | [3-(dimethylamino)propyl] triphenyl phosphonium bromide |
| VIII-11 | acetonyl triphenyl phosphonium bromide |
| VIII-12 | tetrakis(hydroxymethyl)phosphonium chloride |
| VIII-13 | 2-acetonapthonyl triphenyl phosphonium bromide* |
| VIII-14 | 2',5'-dimethoxyphenacyltriphenyl phosphonium bromide |
| VIII-15 | 1-hydroxydodecyl triphenyl phosphonium bromide* |
| VIII-16 | 2-ethylindolinyl triphenyl phosphonium bromide* |
| VIII-17 | 3'-methoxyphenacyl triphenyl phosphonium bromide* |
| VIII-18 | 3-methylpyrridinyl triphenyl phosphonium bromide* |
| VIII-19 | phenacyl dimethylaminophenyl diphenyl phosphonium chloride* |
| VIII-20 | methyl (dimethylaminophenyl diphenyl) phosphonium bromide* |
| VIII-21 | [3-(ethoxycarbonyl)-2-oxypropyl] triphenyl phosphonium chloride* |
| VIII-22 | (2-hydroxybenzyl) triphenyl phosphonium bromide |
| VIII-23 | benzotriazol-1-yloxytripyrrolidino-phosphonium hexafluorophosphate* |
| VIII-24 | triphenyl(2-pyridylmethyl) phosphonium chloride hydrochloride* |
| VIII-25 | (4-ethoxybenzyl) triphenyl phosphonium bromide* |
| VIII-26 | (3-benzyloxypropyl) triphenyl phosphonium bromide* |
| VIII-27 | phenacyl triphenyl phosphonium chloride# |
| VIII-28 | benzotriazol-1-yloxytris(dimethylamino)-phosphonium hexafluorophosphate* |
| VIII-29 | 2-acetonapthonyl triphenyl phosphonium bromide |

Note: The source of all chemicals was Aldrich, unless denoted *. If denoted #, this indicates the source was in-house, Hewlett-Packard.

TABLE IX

List of Light-fast Additives for the Dye-complex.

| No. | Name |
| --- | --- |
| IX-1 | 1-hydroxybenzotriazole hydrate |
| IX-2 | 1-hydroxy-7-azabenzotriazole |
| IX-3 | 3-hydroxy-1,2,3-benzotriazin-4(3H)-one |
| IX-4 | 3,9-bis(octadecyloxy)-2,4,8,10-tetraoxa-3,9-diphosphaspiro[5,5]undecane |
| IX-5 | poly[N,N'-bis(2,2,6,6-tetramethyl-4-piperidinyl)-1,6-hexanediamine-co-2,4-dichloro-6-morpholino-1,3,5-triazine] |
| IX-6 | 2-[5,6-bis(4-sulfophenyl)-1,2,4-triazin-3-yl]-4-(4-sulfophenyl)pyridine, trisodium salt |
| IX-7 | oxonic acid |
| IX-8 | 3-hydroxy-2-quinoxalinecarboxylic acid |
| IX-9 | Fluorescent Brightener 28* |
| IX-10 | 2,3,5-triphenyl-2H-tetrazolium chloride* |

Note: The source of all chemicals was Aldrich, unless denoted *.

EXAMPLES

Example 1

The following components were mixed together by stirring at room temperature until a clear solution was obtained:

| | |
| --- | --- |
| 2-pyrrolidone | 10 parts by weight |
| 1,5-pentanediol | 10 parts by weight |
| dodecyl triphenyl phosphonium bromide | 10 parts by weight |
| Acid Red 97 (Aldrich) | 5 parts by weight |
| Water | 62 parts by weight |
| SOLSPERSE 27,000 | 3 parts by weight. |

The resulting ink was printed with a Hewlett-Packard prototype DeskJet printer having a drop volume of 4 picoliters (pl). The print sample was allowed to dry in air for a few minutes. The print quality was determined by counting the number of nozzles out. The greater the number of nozzles out, the poorer the print quality. In this case, the number of nozzles out was determined to be zero.

The water-fastness of the ink was measured by a continuous dripping of water on a 45 degree inclined print surface for 5 minutes. The optical density (mOD) was measured before and after the application of water on an area near the print. An increase in optical density in the area near the print is an indication of poor water-fastness. In this case, the detected increase in optical density was zero.

The light-fastness of printed ink was measured by an in-house fadometer.

Comparison Example 1

Example 1 was repeated, except that the phosphonium salt was omitted from the formulation. The print quality test also showed the number of nozzles out to be zero. However, the water-fastness test showed an increase in optical density in the neighborhood of the print of up to 500 mOD. The print was smeared by water rinsing everywhere on the print medium.

The two foregoing examples confirm that the water-fastness is significantly increased by the addition of the phosphonium salt to the ink and the formation of the complex between the dye and the salt.

Comparison Example 2

Example 1 was repeated, except that the surfactant (SOLSPERSE 27,000) was omitted. The print quality test showed that the percentage of nozzles out to be 75%. The ink did not print well.

Examples 2–10

Example 1 was repeated, except that the dodecyl triphenyl phosphonium salt was replaced by different phosphonium salts, referring to Tables I, II, III, and IV above. It should be noted in these cases, the concentration of the salt and the concentration of surfactant SOLSPERSE 27,000, water amount were adjusted to achieve good printability. The results are listed in Table X below.

TABLE X

Results for Examples 2–10.

| Example | Water-Fast Phosphonium Salt Number* | Salt Concentration (wt %) | SOLSPERSE 27,000 (wt %) | Nozzles Out (%) | Water-fastness (mOD) |
|---|---|---|---|---|---|
| 2 | 1-1 | 12 | 1 | 0 | 0 |
| 3 | 1-4 | 10 | 3 | 0 | 0 |
| 4 | 1-6 | 8 | 5 | 1 | 0 |
| 5 | 1-11 | 8 | 5 | 1–2 | 0 |
| 6 | 1-23 | 10 | 3 | 0 | 0 |
| 7 | 2-2 | 10 | 3 | 2 | 0 |
| 8 | 3-1 | 8 | 5 | 0 | 5 |
| 9 | 3-5 | 12 | 1 | 2 | 5 |
| 10 | 4-1 | 10 | 3 | 3 | 5 |

Note: *Refer to Tables I, II, III, and IV for the particular phosphonium salt.

Examples 2–10 demonstrate that other water-fast phosphonium salts also are useful in the practice of the invention, in combination with a surfactant (SOLSPERSE 27,000).

Examples 11 to 21

Example 1 was repeated, except that the combination of specific water-fast phosphonium salt and non-water-fast phosphonium salt was used in different concentrations. The results are summarized in Table XI.

TABLE XI

Results for Examples 11–21

| Example | Water-fast Phosphonium Salt and Concentration (wt %)* | Phosphonium Salt and Concentration (wt %)# | SOL SPERSE 27,000 (wt %) | Nozzles Out (%) | Water-fastness (mOD) |
|---|---|---|---|---|---|
| 11 | 1-4, 12% | V-11, 0% | 0 | 75 | Could not be measured |
| 12 | 1-4, 12% | V-11, 2% | 0 | 3 | 0 |
| 13 | 1-4, 12% | V-11, 3% | 0 | 1–2 | 0 |
| 14 | 1-4, 12% | V-11, 4% | 0 | 0–1 | 0 |
| 15 | 1-6, 12% | V-15, 4% | 0 | 0 | 0 |
| 16 | 1-6, 12% | V-14, 4% | 0 | 1–2 | 0 |
| 17 | 1-11, 8% | V-22, 4% | 0 | 1–2 | 1–2 |
| 18 | 1-22, 10% | V-22, 4% | 0 | 1–2 | 0 |
| 19 | 2-2, 5% | V-15, 4% | 0 | 1 | 0–1 |
| 20 | 3-1, 8% | V-15, 4% | 0 | 1–2 | 0–1 |
| 21 | 4-1, 8% | V-15, 4% | 0 | 1–2 | 0–1 |

Note: *Refer to Tables I, II, III, VI for the particular phosphonium salt.
Refer to Table V for the particular phosphonium salt (for improved aqueous dispersion).

Refer to Table V for the particular phosphonium salt (for improved aqueous dispersion).

Examples 11–21 demonstrate that water-fast phosphonium salts also are useful in the practice of the invention in combination with a second phosphonium salt. In this combination, the water-fast phosphonium salts has a relatively long chain (at least 5 carbon atoms) and the other phosphonium salt, or non-water-fast phosphonium salt, has fewer than 5 carbon atoms. The non-water-fast phosphonium salts tend to increase water dispersion stability of the water-fast phosphonium salts.

Examples 22–29

Example 14, 15, 16, 17 were repeated, except that the second phosphonium salts were replaced by specific cationic salts listed in Table VI. The results are summarized in Table XI.

TABLE XII

Results for Examples 22–29.

| Example | Water-fast Phosphonium Salt and Concentration (wt %)* | Specific Cationic Salt and Concentration (wt %)# | SOL-SPERSE 27,000 (wt %) | Nozzles Out (%) | Water-fastness (mOD) |
|---|---|---|---|---|---|
| 22 | 1-4, 12% | 6-4, 4% | 0 | 0–1 | 0 |
| 23 | 1-6, 12% | 6-4, 4% | 0 | 0 | 0 |
| 24 | 1-6, 12% | 6-9, 4% | 0 | 1–2 | 0 |
| 25 | 1-11, 8% | 6-9, 4% | 0 | 1–2 | 1–2 |
| 26 | 1-23, 10% | 6-9, 4% | 0 | 1 | 0 |
| 27 | 1-4, 12% | 6-11, 4% | 0 | 1–2 | 0 |
| 28 | 1-4, 10% | 6-12, 4% | 0 | 1–2 | 0 |
| 29 | 1-23, 10% | 6-7, 4% | 0 | 1 | 1 |

Notes: *Refer to Tables I, II, III, VI for the particular phosphonium salt.
Refer to Table VI for the particular cationic salt (for improved aqueous dispersion).

Refer to Table VI for the particular cationic salt (for improved aqueous dispersion).

Examples 22–29 demonstrate that other cationic salts, including quaternary ammonium salts, sulfonium salts, iodonium salts, and inner salts, also are useful in the practice of the invention, in combination with water-fast phosphonium salts having a relatively long chain of at least 5 carbon atoms.

Examples 30–33

Examples 22–29 were repeated, except that the cationic salts were replaced by poly-functional salts listed in Table VI (starting from number 6–10). The results are summarized in Table XIII below.

TABLE XIII

Results for Examples 30–33.

| Example | Water-fast Phosphonium Salt and Concentration (% wt)* | Specific Poly-functional Cationic Salt and Concentration (wt %)# | SOL-SPERSE 27,000 (wt %) | Nozzles Out (%) | Water-fastness (mOD) |
|---|---|---|---|---|---|
| 30 | 1-1, 8% | 6-12, 0% | 0 | 3 | 100 |
| 31 | 1-1, 8% | 6-12, 4% | 0 | 3 | 10 |
| 32 | 1-1, 8% | 6-11, 2% | 0 | 2–3 | 10 |
| 33 | 1-1, 8% | 6-11, 4% | 0 | 1–2 | 1–2 |

Notes: *Refer to Tables I, II, III, VI for the particular phosphonium salt.

Refer to Table VI for the particular poly-functional cationic salt (for improved aqueous dispersion).

Examples 30–33 demonstrate that polyfunctional cationic salts including are useful in the practice of the invention, in combination with water-fast phosphonium salts having a relatively long chain of at least 5 carbon atoms) in improvement further water-fastness.

INDUSTRIAL APPLICABILITY

The ink-jet inks of the present invention are expected to find use in ink-jet printers.

Thus, there has been disclosed a water-fast, anionic dye-based ink-jet ink, using at least one phosphonium salt for forming a complex with the anionic dye, causing precipitation of the complex on a print medium. It will be readily apparent to those skilled in this art that various changes and modifications may be made without departing from the spirit of the invention, and all such changes and modifications are considered to fall within the scope of the appended claims.

What is claimed is:

1. A water-fast, dye-based, aqueous ink-jet which contains at least one anionic dye, said ink-jet further containing an amount of at least one water-fast phosphonium salt, the amount effective to improve color permanence of the ink, the at least one water-fast phosphonium salt having a chain of at least 5 carbon atoms, and wherein said ink further contains at least one additional cationic salt selected from the group consisting of )a) non-water-fast phosponium salts, (b) cationic salts, (c) catonic polymers, and (d) polyfunctional cationic salts, said at least one cationic salt partially replacing said at least one water-fast phosphonium salt to thereby improve aqueous dispersion stability and printability.

2. The ink-jet ink of claim 1 wherein said non-water-fast phosphonium salts are selected from the group consisting of allyl triphenyl phosphonium bromide, allyl triphenyl phosphonium chloride, vinyl triphenyl phosphonium bromide, (3-bromobutyl)triphenyl phosphonium bromide, (4-bromobutyl)triphenyl phosphonium bromide, (bromodifluoromethyl)triphenylphosphonium bromide, chloroethylene triphenyl phosphonium bromide, 1,1,1-trifluoroacetonyl triphenyl phosphonium bromide, methyl triphenyl phosphonium bromide, ethyl triphenyl phosphonium bromide, propyl triphenyl phosphonium bromide, n-butyl triphenyl phosphonium bromide, isopropyl triphenyl phosphonium bromide, n-pentyl triphenyl phosphonium bromide, acetonyl triphenyl phosphonium bromide, 4-carboxybutyl triphenyl phosphonium bromide, (ethoxycarbonylmethyl)triphenyl phosphonium bromide, (methoxymethyl)triphenyl phosphonium bromide, triphenyl phosphonium hydrobromide, (2-hydroxyethyl)triphenyl phosphonium chloride, (2-hydroxyethyl) triphenyl phosphonium bromide, [3-hydroxy-2-methylpropyl]triphenyl phosphonium bromide, [2-(trimethylsilyl)ethoxymethyl] triphenyl phosphonium chloride, methyltriphenoxy phosphonium iodide, [3-(dimethylamino)propyl]triphenyl phosphonium bromide, and dimethylaminoethyl triphenyl phosphonium bromide.

3. The ink-jet ink of claim 1 wherein said cationic salts are selected from the group consisting of 4-(dimethylamino) pyridinium tribromide, dodecylethyldimethylammonium bromide, 1-dodecylpyridinium chloride hydrate, dodecyltrimethylammonium bromide, 1-ethyl-3-methyl-1H-imidazolium chloride, 1-ethyl-4-(methoxycarbonyl) pyridinium iodide, 6-hydroxy-2,4,5-triaminopyrimidine sulfate, 2-hydroxy-4-methylpyrimidine hydrochloride, stearyl trimethylammonium chloride, p-xylylene-bis (tetrahydrothiophenium chloride), trimethyl sulfonium iodide, diphenyl iodonium chloride, ferrocenium hexafluorophosphate, dodecyldimethyl(3-sulfopropyl) ammonium hydroxide, 1-(N,N-dimethylcarbamoyl)-4(2-sulfo-ethyl)pyridinium hydroxide, and 2-ethyl-5-phenylisoxazolium-3'-sulfonate.

4. The ink-jet ink of claim 1 wherein said cationic polymers are selected from the group consisting of poly (vinylbenzyl trimethylammonium chloride), poly(4-vinylpyridine hydrochloride), polyethyleneimine 80% ethoxylated, polyaniline, and sulfonated poly (diallyldimethylammonium chloride).

5. The ink-jet ink of claim 1 wherein said polyfunctional cationic salts are selected from the group consisting of hexadimethrine bromide, p-xylylene-bis (tetrahydrothiophenium chloride), 1,1'-trimethylenebis[4-(hydroxyimino-methyl)pyridinium bromide], 1,1'-diheptyl-4,4'-bipyridinium dibromide, 1,1'-dioctadecyl-4,4'-bipyridinium diperchlorate, ethyl viologen dibromide, 1,1'-dioctadecyl-4,4'-bipyridinium bromide, and ferrocenium hexafluorophosphate.

6. The ink-jet ink of claim 1 wherein said ink further contains at least one additive for improving light-fastness of said ink.

7. The ink-jet ink of claim 6 wherein said at least one additive is a phosphonium salt selected from the group consisting of (ethoxycarbonylmethyl)triphenyl phosphonium bromide, (ethoxycarbonylmethyl)triphenyl phosphonium chloride, (methoxymethyl)triphenyl phosphonium bromide, triphenyl phosphonium hydrobromide, (2-hydroxyethyl)triphenyl phosphonium chloride, (2-hydroxyethyl)triphenyl phosphonium bromide, [3-hydroxy-2-methylpropyl]triphenyl phosphonium bromide, [2-(trimethylsilyl)ethoxymethyl]triphenyl phosphonium chloride, methyltriphenoxy phosphonium iodide, [3-(dimethylamino)propyl]triphenyl phosphonium bromide, acetonyl triphenyl phosphonium bromide, tetrakis (hydroxymethyl)phosphonium chloride, 2-acetonapthonyl triphenyl phosphonium bromide, 2',5'-dimethoxyphenacyltriphenyl phosphonium bromide, 1-hydroxydodecyl triphenyl phosphonium bromide, 2-ethylindolinyl triphenyl phosphonium bromide, 3'-methoxyphenacyl triphenyl phosphonium bromide, 3-methylpyrridinyl triphenyl phosphonium bromide, phenacyl dimethylaminophenyl diphenyl phosphonium chloride, methyl(dimethylaminophenyl diphenyl)phosphonium bromide, [3-(ethoxycarbonyl)-2-oxypropyl]triphenyl phosphonium chloride, (2-hydroxybenzyl)triphenyl phosphonium bromide, benzotriazol-1-yloxytripyrrolidinophosphonium hexafluorophosphate, triphenyl(2-pyridylmethyl) phosphonium chloride hydrochloride, (4-ethoxybenzyl)triphenyl phosphonium bromide, (3-benzyloxypropyl)triphenyl phosphonium bromide, phenacyl triphenyl phosphonium chloride, benzotriazol-1-yloxytris(dimethylamino)phosphonium hexafluorophosphate, and 2-acetonapthonyl triphenyl phosphonium bromide.

8. The ink-jet ink of claim 6 wherein said at least one additive is selected from the group consisting of triazine, benzotriazol, 1-hydroxybenzotriazole hydrate, 1-hydroxy-7-azabenzo-triazole, 3-hydroxy-1,2,3-benzotriazin-4(3H)-one, 3,9-bis-(octadecyloxy)-2,4,8,10-tetraoxa-3,9-diphosphaspiro[5,5]undecane, poly[N,N'-bis(2,2,-6,6-tetramethyl-4-piperidinyl)-1,6-hexanediamine-co-2,4-dichloro-6-morpholino-1,3,5-triazine], 2-[5,6-bis(4-sulfophenyl)-1,2,4-triazin-3-yl]-4(4-sulfophenyl)pyridine, trisodium salt, oxonic acid, 3-hydroxy-2-quinoxalinecarboxylic acid, and 2,3,5-triphenyl-2H-tetrazolium chloride.

9. The ink-jet ink of claim 6 wherein said at least one additive is present in an amount ranging up to about 10 wt %.

10. A method for forming a water-fast, dye-based, aqueous ink-jet ink which contains at least one anionic dye, said method comprising:

(1) forming a dye-based, aqueous ink-jet ink; and (2) adding to said dye-based, aqueous ink-jet ink an amount of at least one water-fast phosphonium salt, the amount effective to improve color permanence of the ink, the at least one water-fast phosphonium salt having a chain of at least 5 carbon atoms wherein said at least one water-fast phosphonium salt has a formula selected from the group consisting of

$$(Ar)_3—P^+—R1 \ldots X^- \quad (1)$$

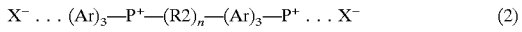

$$X^- \ldots (Ar)_3—P^+—(R2)_n—(Ar)_3—P^+ \ldots X^- \quad (2)$$

$$(R3)_3—P^+—R1 \ldots X^- \quad (3)$$

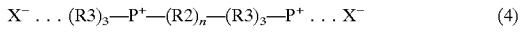

$$X^- \ldots (R3)_3—P^+—(R2)_n—(R3)_3—P^+ \ldots X^- \quad (4)$$

where:

Ar=aryl or substituted aryl;

R1, R2, R3=alkyl, alkenyl, aryl with or without substituents selected from the group consisting of —OH, —NH$_2$, —CO, —CHO, —COO, —COOH, —SH, or —NO$_2$, and may contain conjugated double bonds, and R1 has at least 5 carbon atoms;

X=Cl, Br, I, F, PF$_6^-$, BF$_4^-$, HSO$_3^-$, or NH$_4$SO$_3^-$; and n=an integer in the range of 0 to 9, and where ellipses in each formula above denote ionic association between a cation and an anion, the plus charge of a P atom associated with a negative charge of the counterion X and where said method further includes adding at least one additional cationic salt selected from the group consisting of (a) non-water fast phosphonium salts having less than 5 carbon atoms, (b) cationic salts, (c) cationic polymers, and (d) polyfunctional cationic salts, said at least one cationic salt partially replacing said at least one water-fast phosphonium salt to thereby improve aqueous dispersion stability and printability.

* * * * *

UNITED STATES PATENT AND TRADEMARK OFFICE
CERTIFICATE OF CORRECTION

PATENT NO. : 6,248,161 B1
DATED : June 19, 2001
INVENTOR(S) : Nguyen et al.

It is certified that error appears in the above-identified patent and that said Letters Patent is hereby corrected as shown below:

<u>Column 13,</u>
Lines 42 and 43, "ink-jet" should read -- ink-jet ink --.

Signed and Sealed this

Sixth Day of May, 2003

JAMES E. ROGAN
*Director of the United States Patent and Trademark Office*